United States Patent
Kyoun

(10) Patent No.: US 9,633,400 B2
(45) Date of Patent: Apr. 25, 2017

(54) DISPLAY APPARATUS AND METHOD OF PROVIDING A USER INTERFACE

(71) Applicant: SAMSUNG ELECTRONICS CO., LTD., Suwon-si (KR)

(72) Inventor: Jae-ki Kyoun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 498 days.

(21) Appl. No.: 14/148,216

(22) Filed: Jan. 6, 2014

(65) Prior Publication Data

US 2014/0195913 A1 Jul. 10, 2014

Related U.S. Application Data

(60) Provisional application No. 61/748,920, filed on Jan. 4, 2013.

(30) Foreign Application Priority Data

Jul. 19, 2013 (KR) ........................ 10-2013-0085343

(51) Int. Cl.
| | |
|---|---|
| G06F 3/048 | (2013.01) |
| G06Q 50/00 | (2012.01) |
| H04N 21/431 | (2011.01) |
| H04N 21/4725 | (2011.01) |
| H04N 21/4788 | (2011.01) |
| H04M 1/2745 | (2006.01) |
| H04M 1/725 | (2006.01) |

(52) U.S. Cl.
CPC ......... *G06Q 50/01* (2013.01); *H04N 21/4316* (2013.01); *H04N 21/4725* (2013.01); *H04N 21/4788* (2013.01); *H04M 1/27455* (2013.01); *H04M 1/72522* (2013.01)

(58) Field of Classification Search
CPC ............... G06Q 50/01; H04N 21/4316; H04N 21/4725; H04N 21/4788
USPC ...................................................... 715/719
See application file for complete search history.

(56) References Cited

U.S. PATENT DOCUMENTS

| | | | | |
|---|---|---|---|---|
| 7,844,671 | B1 * | 11/2010 | Lawler | .................... H04L 51/32 |
| | | | | 709/204 |
| 8,082,511 | B2 * | 12/2011 | Sobotka | ................ G06F 3/0482 |
| | | | | 715/745 |
| 8,291,016 | B1 * | 10/2012 | Whitney | ............ G06Q 30/0201 |
| | | | | 709/204 |

(Continued)

*Primary Examiner* — David Phantana Angkool
(74) *Attorney, Agent, or Firm* — Sughrue Mion, PLLC

(57) ABSTRACT

A display apparatus and a method for providing user interface thereof are provided. The method for providing user interface includes searching a feed where a moving image is included from among feeds received from at least one social network and displaying user interface including at least one feed where the moving image is included, in response to a predetermined user command being input. The display apparatus may include a display; a communicator configured to receive a feed from at least one social network; a user input; and a controller configured to search a feed where a feed including a moving image is included from among feeds received through the communicator, in response to a predetermined user command being input, and control the display in order to display a user interface which includes at least one feed including the moving image.

13 Claims, 5 Drawing Sheets

(56) References Cited

U.S. PATENT DOCUMENTS

| | | | | |
|---|---|---|---|---|
| 8,392,271 B2* | 3/2013 | Ho | G06Q 30/02 | 705/26.1 |
| 8,438,069 B2* | 5/2013 | Chong | G06Q 30/0643 | 705/26.1 |
| 8,943,054 B2* | 1/2015 | Caruso | G06F 17/3089 | 705/14.41 |
| 8,977,611 B2* | 3/2015 | Tseng | G06F 17/30722 | 705/319 |
| 9,448,682 B2* | 9/2016 | Yerli | G06F 3/048 | |
| 2011/0087534 A1* | 4/2011 | Strebinger | G06Q 10/06 | 705/14.25 |
| 2011/0202515 A1* | 8/2011 | Stiers | G06F 17/30029 | 707/706 |
| 2011/0238495 A1* | 9/2011 | Kang | G06Q 30/02 | 705/14.49 |
| 2011/0258256 A1* | 10/2011 | Huberman | G06F 17/278 | 709/204 |
| 2012/0324507 A1* | 12/2012 | Weber | H04H 20/38 | 725/37 |
| 2013/0227596 A1* | 8/2013 | Pettis | H04N 21/2353 | 725/13 |
| 2014/0019253 A1* | 1/2014 | Ricasata | G06Q 30/0241 | 705/14.64 |
| 2014/0129460 A1* | 5/2014 | Budzienski | G06Q 10/1053 | 705/321 |
| 2014/0270407 A1* | 9/2014 | Balakrishnan | G06F 17/30256 | 382/118 |
| 2014/0306999 A1* | 10/2014 | Yim | G06T 11/60 | 345/635 |
| 2015/0025977 A1* | 1/2015 | Doyle | G06Q 50/01 | 705/14.66 |
| 2015/0032740 A1* | 1/2015 | Rao | G06F 17/30867 | 707/725 |
| 2015/0039565 A1* | 2/2015 | Lucas | G06F 17/30595 | 707/667 |
| 2015/0120767 A1* | 4/2015 | Skeen | G06F 17/30752 | 707/754 |
| 2015/0199431 A1* | 7/2015 | Brunet | G06Q 30/016 | 705/304 |
| 2015/0281307 A1* | 10/2015 | Hartwell | H04L 65/604 | 709/219 |
| 2015/0356093 A1* | 12/2015 | Abbas | G06F 17/30058 | 707/748 |
| 2016/0070786 A1* | 3/2016 | Myslinski | G06F 17/30719 | 709/204 |
| 2016/0092581 A1* | 3/2016 | Joshi | G06F 17/3053 | 707/732 |

* cited by examiner

DISPLAY APPARATUS AND METHOD OF PROVIDING A USER INTERFACE

CROSS-REFERENCE TO RELATED APPLICATIONS

This application claims priority from Korean Patent Application No. 10-2013-0085343, filed in the Korean Intellectual Property Office on Jul. 19, 2013, and U.S. Provisional Application No. 61/748,920, filed in the U.S. Patents and Trademark Office on Jan. 4, 2013, the disclosures of which is incorporated herein by reference, in their entirety.

BACKGROUND

1. Technical Field

Aspects of the exemplary embodiments relate to a display apparatus and a method of providing user interface. More particularly, the exemplary embodiments relate to a display apparatus capable of displaying a feed which is received from at least one social network service and a method of providing user interface.

2. Description of the Related Art

A display apparatus not only displays broadcast contents, but also provides various services, due to its connection to an external network.

As the number of social network services increase, a display apparatus also provides various services provided from a social network. For example, it is possible to access social network services such as Facebook or Twitter through a television.

In particular, users may wish to watch a video from among contents received from a social network by using a display apparatus which provides a large screen and clear images. However, the prior art display apparatus simply provide a feed received from a social network. Thus, users need to check received feeds, one by one, in order to find a feed including a video, which results in inconvenience to the users.

In particular, when users receive a number of feeds from members of a social network, it takes a lot of time and effort to search for a feed which includes a video, from among the many feeds.

SUMMARY

An aspect of the exemplary embodiments relates to a display apparatus capable of searching and providing a feed, including a video, from among feeds received from a social network and a method of providing user interface.

A method for providing a user interface of a display apparatus according to an exemplary embodiment includes searching a feed where a moving image is included, from among feeds received from at least one social network and displaying a user interface including at least one feed where the moving image is included, in response to a predetermined user command being input.

The displaying may include displaying a thumbnail image of a moving image related to each of at least one feed included in the user interface.

The searching may include searching a feed where a moving image is included by analyzing tag information included in a feed received from the at least one social network.

The method may further include, when one feed from at least one feed included in the user interface is selected, displaying detailed information regarding the selected feed.

The detailed information of the selected feed may include at least one of information regarding a social network which provides the selected feed, a thumbnail image related to a moving image included in the selected feed, comments from a writer of the selected feed, and comments from friends regarding the selected feed.

The moving image may be one of a moving image which is directly uploaded by a writer of the feed and a linked moving image.

The searching may include searching a feed where a moving image is included from among feeds received from the at least one of the selected social network in response to their being a plurality of social networks and at least one of the plurality of social networks is selected.

A display apparatus according to an exemplary embodiment includes a display, a communicator configured to receive a feed from at least one social network, user unit, and a controller configured to search a feed where a moving image is included from among feeds received through the communicator in response to a predetermined user command being input, and controls the display to display a user interface including at least one feed which includes the moving image.

The controller may be configured to control the display in order to display a thumbnail image of a moving image on each of at least one feed included in the user interface.

The controller may be configured to search a feed where a moving image is included by analyzing tag information included in a feed received through the communicator.

The controller may control the display to display detailed information regarding the selected feed in response to one of at least one feed included in the user interface being selected through the user input.

The detailed information of the selected feed may include at least one of information regarding a social network which provides the selected feed, a thumbnail image of a moving image included in the selected feed, comments from a writer of the selected feed, and comments from friends regarding the selected feed.

The moving image may be one of a moving image which is directly uploaded by a writer of the feed and a linked moving image.

The controller may search a feed where a moving image is included from among feeds received from the at least one of the selected social network in response to there being a plurality of social networks and at least one of the plurality of social networks being selected.

An aspect of an exemplary embodiment may provide a display apparatus for displaying a feed from a social network on a user interface, the display device including: a display; a communicator configured to receive a feed from at least one social network in response to a user input; and a controller configured to search the feed received by the communicator, where the feed includes a moving image, from among feeds received through the communicator, and the controller is configured to control the display in order to display a user interface which includes the at least one feed including a moving image, wherein a user may select a feed including a moving image from among the feeds displayed on the interface, and wherein the controller is configured to search a feed including a moving image by analyzing tag information included in a feed received through the communicator.

The display apparatus may further include a user input for user selection of a feed including a moving image, and wherein the controller is configured to display on the interface information related to the feed selected by a user.

The controller may be configured to control the display in order to display detailed information regarding the selected feed, in response to one feed from the at least one feed included in the user interface being selected through the user input.

The detailed information related to the selected feed may include at least one of information regarding a social network which provides the selected feed and a thumbnail image of a moving image included in the selected feed.

The moving image may be one of a moving image which is directly uploaded by a writer of the feed and a linked moving image.

The detailed information related to the selected feed may further include at least one of comments from a writer of the selected feed and comments from friends regarding the selected feed. According to the above-described various exemplary embodiments, a user may more easily and conveniently watch moving image contents included in a feed received from a social network using a display apparatus.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

It should be observed that the method steps and system components have been represented by known symbols in the figures, showing only specific details which are relevant for an understanding of the exemplary embodiments. Further, details readily apparent to persons of ordinarily skill in the art may not have been disclosed. In the exemplary embodiments, relational terms such as first and second, and the like, may be used to distinguish one entity from another entity, without necessarily implying any actual relationship or order between such entities.

Figure 1:
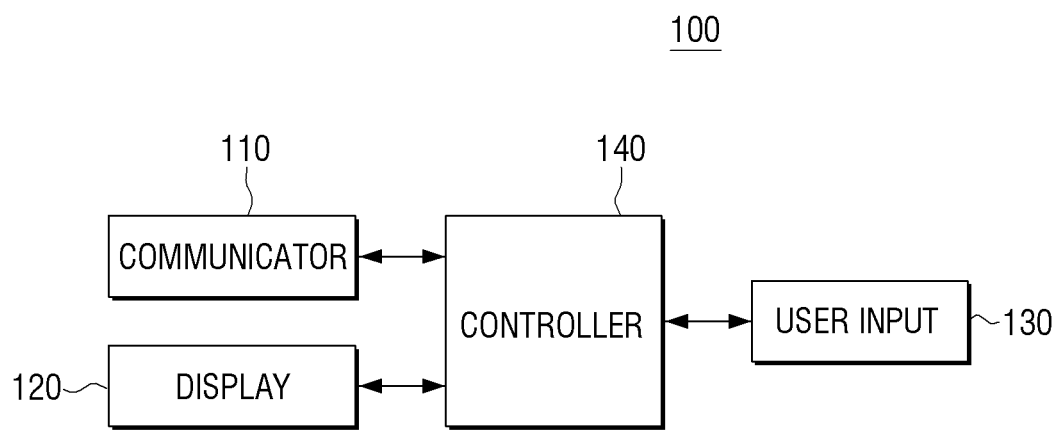
FIG. 1 is a view which briefly illustrates a configuration of a display apparatus according to an exemplary embodiment.

FIG. 1 is a view which briefly illustrates a configuration of a display apparatus 100 according to an exemplary embodiment. As illustrated in FIG. 1, the display apparatus 100 comprises a communicator 110, a display 120, a user input 130, and a controller 140. In this case, the display apparatus 100 may be implemented as a smart television, but this is only an example. The display apparatus 100 may be implemented as various display apparatuses such as a smart phone, a tablet PC, a notebook PC, a desktop PC, and so on.

The communicator 110 performs communication with an external display apparatus or with a server. In particular, the communicator 110 receives a feed from various sources through a social network. The feed may be a feed received from members of a social network, but is not limited thereto, because the feed may be implemented as various feeds, such as a news feed, an RSS feed, and so on. In this case, the feed may not only include comments by users, but may also include various contents such as moving images, photos, and music.

The display 120 displays image data under the control of the controller 140. In particular, the display 120 may display a user interface including a feed which contains a moving image. In addition, when a feed out of user interface including a feed where a moving image is included is selected through the user input 130, the display 120 may display detailed information regarding the selected feed.

The user input 130 receives a user command to control the display apparatus 100. In particular, the user input 130 may receive a user command to generate a user interface including a feed where a moving image is included, and may receive a user command to select a feed from among user interfaces, including a feed where a moving image is included.

The controller 140 controls overall operations of the display apparatus 100 according to a user command input through the user input 130. In particular, in response to a predetermined command being input through the user input 130, the controller 140 may search a feed including a moving image, from among feeds received from at least one social network, and may control the display 129 in order to display a user interface which includes at least one feed where a moving image is included, based on the result of the search.

Specifically, in response to a user command to check only those feeds which include a moving image (for example, a user command to select a predetermined icon of a menu) being input through the user input 130, the controller 140 may search through the communicator 140 for a feed from among feeds received from at least one social network, which includes a moving image. In this case, the controller 140 may search for a feed including a moving image by checking tag information included in the feeds received from at least one social network. Herein, the moving image included in a feed may be a moving image which is directly uploaded by a user or may be a linked moving image.

According to an exemplary embodiment, a feed may be received from all social networks that are used by users who log onto the networks, but this is only an example. A feed may be received using only those social networks which are selected by users. Specifically, in response to there being a plurality of social networks which provide feeds, and one of the plurality of social networks is selected through the user input 130, the controller 140 may search a feed which includes a moving image from among feeds received from the selected social network.

In addition, the controller 140 may control the display 120 in order to display a user interface including at least one of searched feeds. In this case, in order to allow a user to check a moving image included in a feed more easily, the controller 140 may control the display 120 in order to display a thumbnail image of the moving image on each of at least one feed included in user interface.

Further, in response to one feed of at least one feed included in user interface being selected through the user input 130, the controller 140 may control the display 120 to display detailed information regarding the selected feed. In this case, the detailed information regarding the selected feed may include at least one of information regarding the social network which provides the selected feed, a thumbnail image of a moving image included in the selected feed, comments from a user who has written the selected feed and comments from friends regarding the selected feed.

According to the above-described display apparatus, a user may watch a moving image included in a feed of a social network using the display apparatus with a large and clear display more easily and conveniently by checking the moving image included in a feed.

Figure 2:
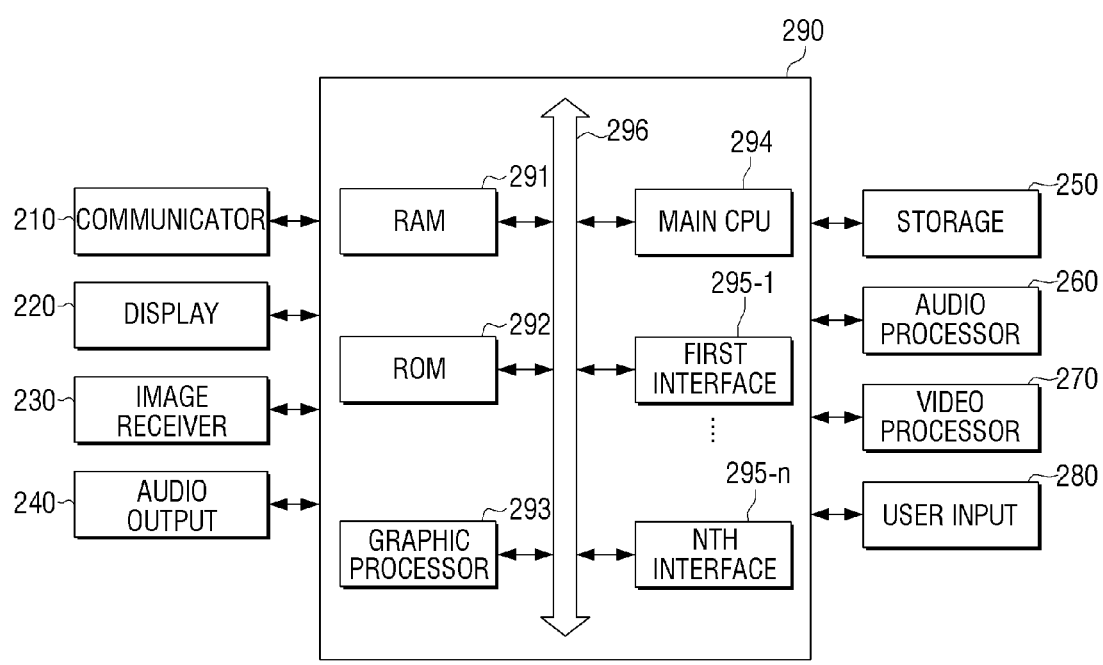
FIG. 2 is a view which illustrates a detailed configuration of a display apparatus according to an exemplary embodiment.

Hereinafter, the display apparatus will be explained in greater detail with reference to FIGS. 2 to 4. FIG. 2 is a view which illustrates a configuration of a display apparatus 200 according to an exemplary embodiment. As illustrated in FIG. 2, the display apparatus 200 comprises a communicator 210, a display 220, an image receiver 230, an audio output 240, a storage 250, an audio processor 260, a video processor 270, an input 280, and a controller 290.

It is assumed that the display apparatus 200 of FIG. 2 is an apparatus performing various functions, such as a content recommendation function, a communication function, a video reproduction function, a display function, and so on, and each element is described in a comprehensive manner. Thus, depending on the exemplary embodiment, some elements illustrated in FIG. 2 may be omitted or changed, or other elements may be added.

The communicator 210 is an element which performs communication with various types of external apparatuses, according to various types of communication methods. In particular, in order to provide a user with a social network service, the communicator 210 may communicate with a social network server or another electronic apparatus. The communicator 210 may receive a feed from at least one social network server in real time. In this case, the feed may include user comments and contents such as moving images, photos, and music. In addition, the feed may be received from a registered friend of a user who logs on, but is not limited thereto. In fact, the feed may be a news feed, RSS feed, and so on.

The communicator 210 may comprise various communication chips such as a WiFi chip, a Bluetooth® chip, a Near Field Communication (NFC) chip, a wireless communication chip and so on. In this case, the WiFi chip, the Bluetooth® chip, and the NFC chip perform communication according to a WiFi method, a Bluetooth® method, and an NFC method respectively. The NFC chip refers to a chip which operates according to an NFC method by using 13.56 MHz from among various RF-ID frequency bands, such as 135 kHz, 13.56 MHz, 433 MHz, 860~960 MHz, 2.45 GHz, and so on. When the WiFi chip or the Bluetooth chip is used, various connection information such as SSID, session key, etc., is received/transmitted in advance so that various information can be received/transmitted using the same. The wireless communication chip refers to a chip which performs communication according to various communication standards such as IEEE®, Zigbee®, 3rd Generation (4G), 3rd Generation Partnership Project (3GPP), Long Term Evolution (LTE), and so on.

The display 220 displays at least one of a video frame which is processed by the video processor 270 after being received from the image receiver 230 and various screens generated by a graphic processor 293. In particular, the display 220 may display a user interface which includes a feed where a moving image is included. In addition, when a feed out of a user interface, including a feed where a moving image is included is selected through the user input 280, the display 220 may display detailed information regarding the selected feed.

The image receiver 230 receives image data through various sources. For example, the image receiver 230 may receive broadcast data from an external broadcasting station, and may receive image data from an external device (for example, a DVD apparatus).

The audio output 240 is an element which outputs not only various audio data processed by the audio processor 260, but also outputs various sounds and voice messages.

The storage 250 stores various modules to drive the display apparatus 200. For example, the storage 250 may store software including a base module, a sensing module, a communication module, a presentation module, a web browser module and a service module. In this case, the base module refers to a basic module which processes a signal transmitted from each element of hardware included in the display apparatus 200, and transmits the processed signal to an upper layer module. The sensing module is a module which collects information from various sensors, and analyzes and manages the collected information. The sensing module may include a face recognition module, a voice recognition module, a motion recognition module, an NFC recognition module, and so on. The presentation module is a module to compose a display screen. The presentation module includes a multimedia module for reproducing and outputting multimedia contents, and a UI rendering module for UI and graphic processing. The communication module is a module to perform communication with the outside. The web browser module refers to a module which accesses a web server by performing web-browsing. The service module is a module which includes various applications for providing various services.

As described above, the storage 250 may include various program modules, but some of the various program modules may be omitted, changed, or added according to the type and attribute of the display apparatus 200. For example, when the display apparatus 200 is implemented as a tablet PC, the base module may further comprise a location determination module to determine a GPS-based location, and the sensing module may further comprise a sensing module to detect user motion.

The audio processor 260 is an element which processes audio data. The audio processor 260 may perform various processing with respect to audio data such as decoding, amplification, noise filtering, and so on. The audio data processed by the audio processor 260 may be output to the audio output 240.

The video processor 270 is an element which processes image data received from the image receiver 230. The image processor 270 may perform various processing with respect to image data such as decoding, scaling, noise filtering, frame rate conversion, resolution conversion, and so on.

The user input 280 receives a user command to control overall operations of the display apparatus 200. In this case, the user input 280 may be implemented as a remote controller, but is not limited thereto. The user input 280 may be implemented as various input devices in order to control the display apparatus 200, such as a touch panel, a pointing device, and so on.

In particular, the user input 280 may receive a user command to generate a user interface which includes a feed where a moving image is included, and may receive a user command to select a feed from among the feeds in a user interface which includes a feed including a moving image.

The controller 290 controls overall operations of the display apparatus 200 by using various programs stored in the storage 250.

Figure 3:
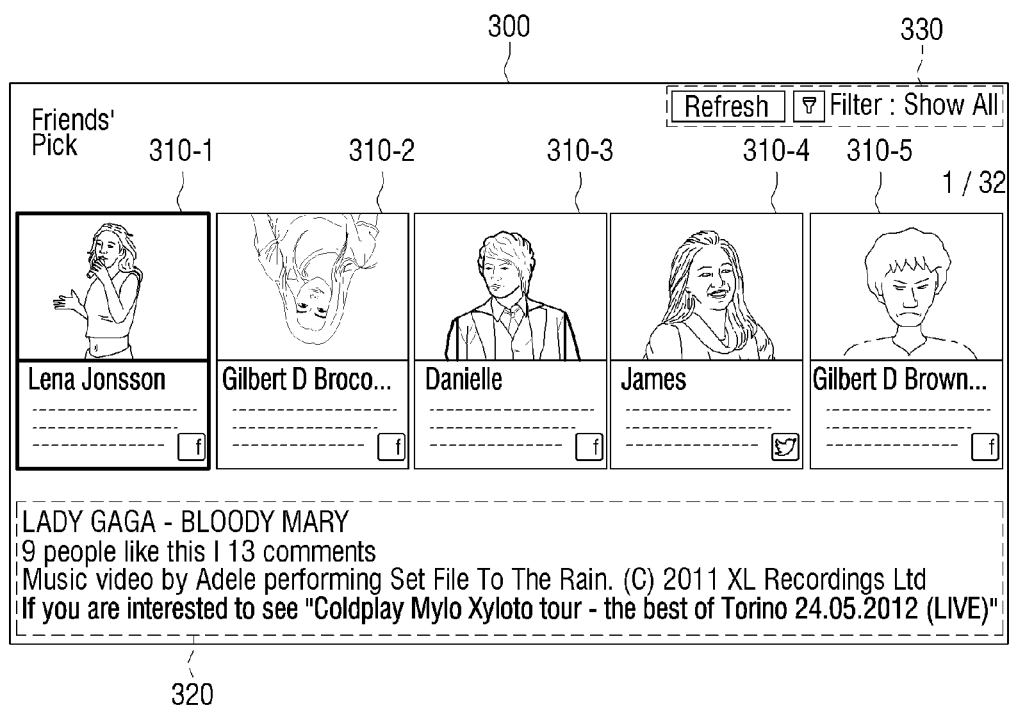
FIG. 3 is a view which illustrates a user interface which includes a feed including a video according to an exemplary embodiment.

As illustrated in FIG. 3, the controller 290 comprises a RAM 291, a ROM 292, a graphic processor 293, a main CPU 294, first to nth interfaces 295-1~295-n and a bus 296. In this case, the RAM 291, the ROM 292, the graphic processor 293, the main CPU 294, and the first to nth interfaces 295-1~295-n may be connected to each other through the bus 296.

The ROM 292 stores a set of commands for system booting. In response to a turn-on command being input and power being supplied, the main CPU 294 copies onto the RAM 291 an O/S stored in the storage 250, according to a command stored in the ROM 292 and boots a system by executing the O/S. In response to the booting being completed, the main CPU 294 copies various application programs stored in the storage 250 onto the RAM 291 and performs the various operations by executing the application programs copied in the RAM 291.

The graphic processor 293 generates a screen including various objects such as an icon, an image, and a text using a computing unit (not shown) and a rendering unit (not shown). The computing unit computes property values such as coordinates, shape, size and color of each object to be displayed according to the layout of the screen, using a control command received from the user input 280. The rendering unit generates a screen with various layouts which include objects based on the property values computed by the computing unit. The screen generated by the rendering unit is displayed within the display area of the display 220. In particular, the graphic processor 293 may generate a UI which includes a feed where a moving image is included.

The main CPU 294 accesses the storage 250 and performs booting using an O/S stored in the storage 250, and performs various operations using various programs, contents and data stored in the storage 250.

The first to nth interfaces 295-1~295-n are connected to the above-described various components. One of the interfaces may be a network interface which is connected to an external apparatus, via network.

In particular, in response to a predetermined command being input through the user input 280, the controller 290 searches a feed where a moving image is included from among feeds received through the communicator 210, and controls the display 220 to display a user interface including at least one feed where a moving image is included.

Specifically, when a user command to generate user interface including a feed where a moving image is included (for example, a user command to select one of the menus displayed on the display 220, a user command to select a predetermined button of a remote controller, a user voice command, a user motion command, and so on) is received through the controller 290, the controller 290 may search a feed where a moving image is included from among feeds received from at least one social network through the communicator 210. In particular, in response to a specific user being logged on, the controller 290 may receive a feed from at least one social network which is used by the user and may search a feed where a moving image is included. In this case, the controller 290 may check tag information of the received feed in order to figure out whether a moving image is included in the received feed.

Meanwhile, according to an exemplary embodiment, the moving image included in the feed may be a moving image which is directly uploaded by a user or a linked moving image.

In response to a feed including a moving image being searched, the controller 290 may control the display 220 in order to generate and display UI 300 including a feed where a moving image is included, as illustrated in FIG. 3. In this case, the UI 300 comprises a plurality of feeds 310-1, 310-2, 310-3, 310-4, 310-5 where a moving image is included, an area 320 for indicating information regarding a moving image included in a highlighted feed, and an area 330 for filtering social networks as illustrated in FIG. 3.

As illustrated in FIG. 3, each of the plurality of feeds 310-1, 310-2, 310-3, 310-4, 310-5, including a moving image which are included in the UI 300, may include a thumbnail image of a moving image included in the feeds, information regarding feed writers, at least part of comments included in the feeds, date of writing feeds, and information regarding social networks which provide feeds.

The area 320, which indicates information regarding a moving image included in a highlighted feed, may include a title of a moving image included in a highlighted feed, recommendation information and moving image information, as illustrated in FIG. 3.

The area 330 for filtering social networks includes a filtering icon to select a social network which receives a feed and a refresh icon to search a feed including a moving image from among feeds received from a selected social network. For example, in response to "Facebook" being selected through the filtering icon and then, the refresh icon is selected, the controller 290 may search a feed including a moving image from among feeds received through "Facebook" and may control the display 220 to display the searched feed.

Subsequently, in response to one of the plurality of feeds 310-1, 310-2, 310-3, 310-4, 310-5 included in the UI 300 being selected, the controller 290 may control the display 220 to display detailed information regarding the selected feed. Specifically, in response to the first feed 310-1 being selected from the UI 300 illustrated in FIG. 3, the controller 290 may control the display 220 to display a detailed information page 400 regarding the first feed 310-1, as illustrated in FIG. 4.

Figure 4:
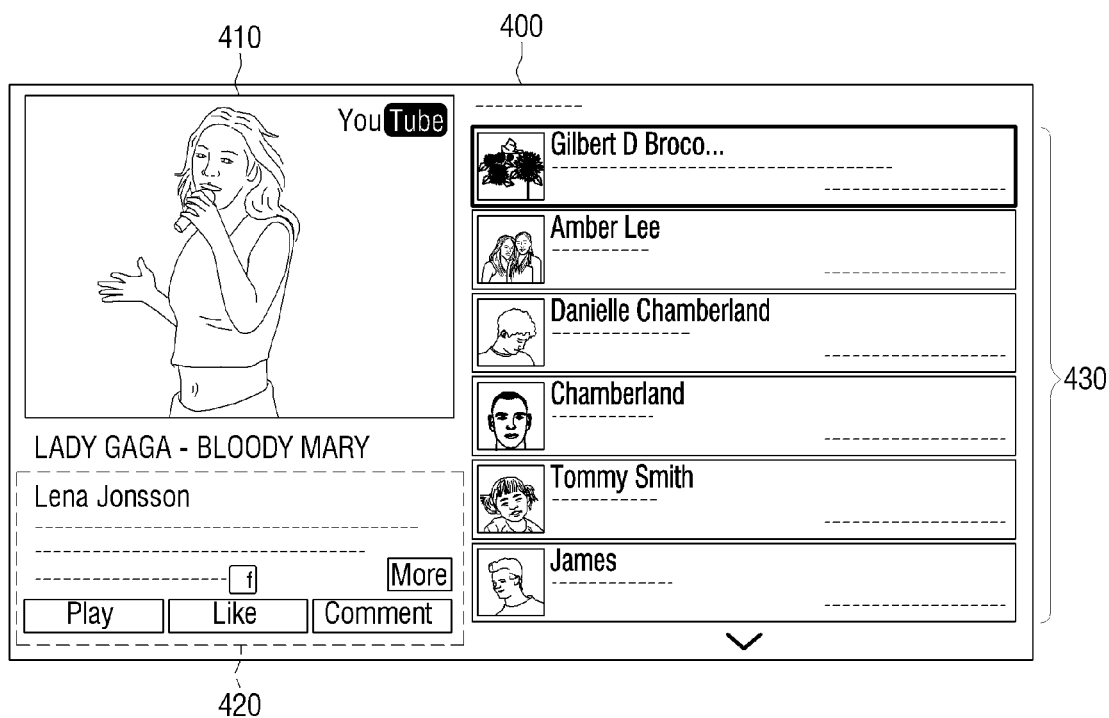
FIG. 4 is a view which illustrates detailed information related to a selected feed when one feed is selected from among user interfaces which include a feed which includes a video according to an exemplary embodiment.

In this case, the detailed information page 400 illustrated in FIG. 4 may include an area 410 for displaying a moving image, an area 420 for displaying information regarding the selected feed 310-1 and an area 430 for displaying comments from friends regarding the selected feed 310-1.

In this case, the moving image display area 410 may display a thumbnail image of a moving image included in the selected feed 310-1. In response to a command to reproduce a moving image being input, a moving image included in the selected feed 310-1 is displayed on the moving image display area 410.

The area 420 for displaying information regarding the selected feed 310-1 may include comments from a writer of the selected feed 310-1, information regarding the time when the selected feed 310-1 is written, information regarding a social network which provides the selected feed 310-1.

In addition, the area 430 for displaying comments from friends regarding the selected feed 310-1 may include evaluation, recommendation, comments, etc., from friends regarding a moving image included in the selected feed 310-1.

By using the UIs 300, 400 illustrated in FIGS. 3 and 4, a user may more easily and conveniently watch moving image contents received from social networks through a display apparatus with a large and clear screen.

Hereinafter, a method for providing a user interface of the display apparatus 100, will be explained with reference to FIG. 5.

Figure 5:
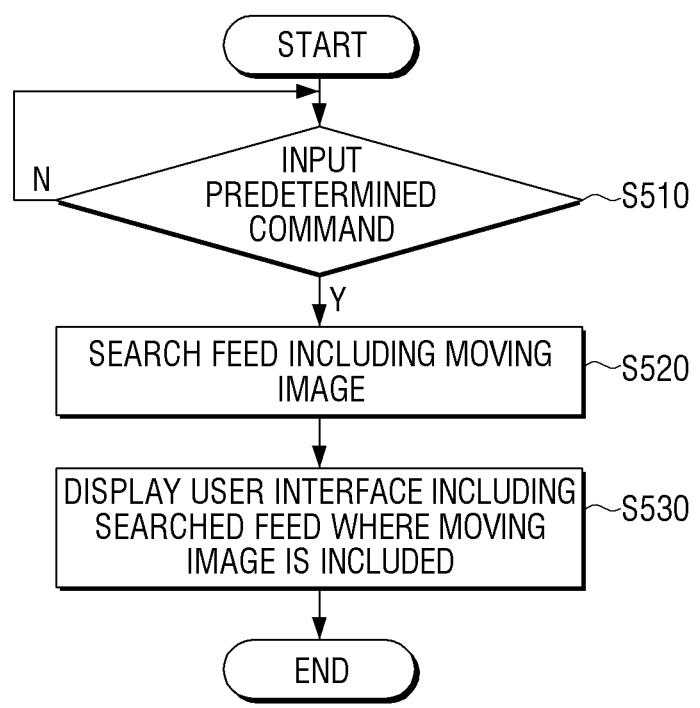
FIG. 5 is a flowchart provided to explain a method of providing a user interface of a display apparatus according to an exemplary embodiment.

In FIG. 5, the display apparatus 100 determines whether a predetermined command to generate a user interface which includes a feed where a moving image is included is input (S510). In this case, the predetermined command may be at least one of a user command to select one of displayed menus, a user command to select a predetermined button of a remote controller, a user voice command, and a user motion command, etc., but is not limited thereto.

In response to the predetermined command being input (S510-Y), the display apparatus 100 searches a feed including a moving image (S520). Specifically, the display apparatus 100 may check tag information included in a feed received from at least one social network and search a feed including a moving image. In this case, the moving image included in a feed may be a moving image which is directly uploaded by a user or a linked moving image. In particular, the display apparatus 100 may search all social networks that are used by users who log onto the networks, but this is only an example. The display apparatus 100 may search a feed including a moving image from among feeds received from a social network, which is selected by a user.

Subsequently, the display apparatus 100 displays a user interface including the searched feed where a moving image is included (S530). Specifically, the display apparatus 100 may display the UI 300 including only feeds where a moving image is included as illustrated in FIG. 3, based on the search result.

According to the above-described method for providing a user interface, a user may more easily and conveniently view moving image contents included in a feed received from a social network using a display apparatus.

In the above exemplary embodiment, a user interface is displayed which includes a feed where only a moving image is included, but this is only an example. This technical feature may also be applied to an exemplary embodiment where a user interface, including feeds where only other types of contents are included, is displayed. For example, a display apparatus may display a user interface which includes feeds where only music contents are included.

In addition, the method for providing user interface of a display apparatus according to various exemplary embodiments may be implemented as a program and provided in the display apparatus. In addition, a non-transitory computer readable storage medium where the program is stored may be provided. The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray Disc™, USB, memory card, and ROM, and provided therein The foregoing exemplary embodiments and advantages are merely exemplary and are not to be construed as limiting. The present teachings can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of providing a user interface of a display apparatus, the method comprising:
    searching a feed including a moving image from among feeds received from a plurality of social networks by analyzing tag information included in the feed received from the plurality of social networks in response to a predetermined user command being input;
    displaying the user interface including a plurality of feeds which includes the moving image; and
    displaying detailed information regarding a selected feed in response to one feed of the plurality of feeds included in the user interface being selected,
    wherein the plurality of feeds included in the user interface is received from the plurality of social networks.

2. The method as claimed in claim 1, wherein the displaying comprises displaying a thumbnail image of a moving image on each of at least one feed included in the display of the user interface.

3. The method as claimed in claim 1, wherein the detailed information related to the selected feed includes at least one of information regarding a social network which provides the selected feed from among the plurality of social networks, a thumbnail image of a moving image included in the selected feed, comments from a writer of the selected feed and comments from friends regarding the selected feed.

4. The method as claimed in claim 1, wherein the moving image is one of a moving image which is directly uploaded by a writer of the feed and a linked moving image.

5. A display apparatus, comprising:
    a display;
    a communicator configured to receive a feed from a plurality of social networks;
    a user input; and
    a controller configured to search a feed where a feed including a moving image is included from among feeds received through the communicator by analyzing tag information included in the feed received from the plurality of social networks, in response to a predetermined user command being input, and control the display in order to display a user interface which includes at least one feed including the moving image and to display detailed information regarding the selected feed, in response to one feed from the of at least one feed included in the user interface being selected through the user input.

6. The apparatus as claimed in claim 5, wherein the controller is configured to control the display in order to display a thumbnail image of a moving image on each of the at least one feed included in the user interface.

7. The apparatus as claimed in claim 5, wherein the detailed information of the selected feed includes at least one of information regarding a social network which provides the selected feed from among the plurality of social networks, a thumbnail image of a moving image included in the selected feed, comments from a writer of the selected feed and comments from friends regarding the selected feed.

8. The apparatus as claimed in claim 5, wherein the moving image is one of a moving image which is directly uploaded by a writer of the feed and a linked moving image.

9. A display apparatus for displaying a plurality of feeds from a plurality of social networks on a user interface, the display device comprising:
    a display;
    a communicator configured to receive a feed from a plurality of social networks in response to a user input; and
    a controller configured to search the feed received by the communicator, where the feed includes a moving image, from among feeds received through the communicator, and the controller is configured to control the display in order to display a user interface which includes a plurality of feeds including a moving image,
    wherein the plurality of feeds included in the user interface is received from the plurality of social networks, wherein a user may select a feed including a moving image from among the plurality of feeds displayed on the user interface, and wherein the controller is configured to search a feed including a moving image by analyzing tag information included in a feed received through the communicator and to control the display in order to display detailed information regarding a selected feed, in response to one feed from among the plurality of feeds displayed on the user interface being selected through the user input.

10. The display apparatus of claim 9, further including a user input for user selection of a feed including a moving image, and wherein the controller is configured to displaying on the interface information related to the feed selected by a user.

11. The apparatus as claimed in claim 9, wherein the detailed information related to the selected feed includes at least one of information regarding a social network which provides the selected feed from among the plurality of social networks and a thumbnail image of a moving image included in the selected feed.

12. The apparatus as claimed in claim 11, wherein the moving image is one of a moving image which is directly uploaded by a writer of the feed and a linked moving image.

13. The display apparatus of claim 11, wherein the detailed information related to the selected feed further includes at least one of comments from a writer of the selected feed and comments from friends regarding the selected feed.

* * * * *